United States Patent
Chen et al.

(10) Patent No.: US 10,775,672 B2
(45) Date of Patent: Sep. 15, 2020

(54) DISPLAY DEVICE

(71) Applicant: Au Optronics Corporation, Hsinchu (TW)

(72) Inventors: Wei-Ren Chen, Hsinchu (TW); Lin-Chieh Wei, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/595,484

(22) Filed: Oct. 8, 2019

(65) Prior Publication Data

US 2020/0183207 A1  Jun. 11, 2020

Related U.S. Application Data

(60) Provisional application No. 62/775,469, filed on Dec. 5, 2018.

(30) Foreign Application Priority Data

Apr. 17, 2019  (TW) .............................. 108113367 A

(51) Int. Cl.
*G02F 1/1339* (2006.01)
*G02F 1/1335* (2006.01)
*G02F 1/1362* (2006.01)

(52) U.S. Cl.
CPC ...... *G02F 1/1339* (2013.01); *G02F 1/133512* (2013.01); *G02F 1/133514* (2013.01); *G02F 1/136286* (2013.01); *G02F 2001/13629* (2013.01); *G02F 2201/123* (2013.01)

(58) Field of Classification Search
CPC ............. G02F 1/133512; G02F 1/1339; G02F 1/136286; G02F 2001/13629
See application file for complete search history.

(56) References Cited

U.S. PATENT DOCUMENTS

| | | |
|---|---|---|
| 6,667,790 B2 | 12/2003 | Yanagawa et al. |
| 7,623,212 B2 | 11/2009 | Lee |
| 7,656,496 B2 | 2/2010 | Kim et al. |
| 9,523,900 B2 | 12/2016 | Morinaga et al. |
| (Continued) | | |

FOREIGN PATENT DOCUMENTS

| | | |
|---|---|---|
| CN | 104508547 | 4/2015 |
| JP | 2002196338 | 7/2002 |

*Primary Examiner* — Michael H Caley
*Assistant Examiner* — Mariam Qureshi
(74) *Attorney, Agent, or Firm* — JCIPRNET

(57) ABSTRACT

A display device includes a first substrate, first signal lines, second signal lines, active elements, pixel electrodes, a second substrate, a black matrix, a first spacer, and a second spacer. The active elements are electrically connected with the first signal lines and the second signal lines. The black matrix includes first portions and second portions. The first portions overlap the first signal lines. The second portions overlap the second signal lines. The first spacer overlaps a source and a drain of one of the active elements. The second spacer overlaps a source and a drain of another one of the active elements. The shortest distance between the center of the first spacer and the center line of the closest one of the first portions is different from the shortest distance between the center of the second spacer and the center line of the closest one of the first portions.

20 Claims, 15 Drawing Sheets

(56) References Cited

U.S. PATENT DOCUMENTS

| | | | |
|---|---|---|---|
| 2015/0028363 A1* | 1/2015 | Lee | G02F 1/13452 257/88 |
| 2015/0192834 A1 | 7/2015 | Morinaga et al. | |
| 2015/0325705 A1* | 11/2015 | Choi | G02F 1/136227 257/72 |
| 2020/0050063 A1* | 2/2020 | Yoshida | G02F 1/134363 |

* cited by examiner

DISPLAY DEVICE

CROSS-REFERENCE TO RELATED APPLICATION

This application claims the priority benefits of U.S. provisional application Ser. No. 62/775,469, filed on Dec. 5, 2018, and Taiwan application serial no. 108113367, filed on Apr. 17, 2019. The entirety of each of the above-mentioned patent applications is hereby incorporated by reference herein and made a part of this specification.

BACKGROUND

Technical Field

The disclosure generally relates to a display device, and particularly relates to a display device including a plurality of spacers.

Description of Related Art

At present, a liquid crystal display device generally includes an upper substrate, a lower substrate, and a liquid crystal layer located between the upper substrate and the lower substrate. Generally, during manufacturing of the liquid crystal display device, after various elements on the upper substrate and the lower substrate are manufactured, the upper substrate and the lower substrate are aligned with each other and fixed with a sealant or other components. In various procedures for manufacturing the display device, the display quality of the display device may be affected if an offset occurs in one of the procedures.

The size of a cell gap is an important parameter that affects the display quality of the liquid crystal display device. Generally, a plurality of spacers may be arranged between the upper substrate and the lower substrate of the liquid crystal display device to control the sizes of cell gaps, so that the sizes of the cell gaps of the entire liquid crystal display device are uniformly distributed. However, if an offset occurs in the procedure of aligning the upper substrate with the lower substrate, the spacers may, as a consequence, not be able to be aligned to the preset positions. The spacers being unable to be aligned to the preset positions may result in a non-uniform distribution of the cell gaps and lead to a lowered display quality of the liquid crystal display device.

In the liquid crystal display device, an electric field between a common electrode and a pixel electrode is used to control twisting of liquid crystal molecules. In general, the common electrode may be electrically connected with a plurality of wires connected to a driving circuit through a plurality of through holes. However, if an offset occurs in the procedure of forming the through holes, the common electrode and the wires are unable to be electrically connected normally. As a result, the voltage distribution on the common electrode is not uniform, and the display quality of the display device is affected.

SUMMARY

The disclosure provides a display device capable of alleviating the decline in display quality due to an offset in a procedure.

At least one embodiment of the disclosure provides a display device. The display device includes a first substrate, a plurality of first signal lines and a plurality of second signal lines, a plurality of active elements, a plurality of pixel electrodes, a second substrate, a black matrix, a first spacer and a second spacer. The plurality of first signal lines and the plurality of second signal lines are located on the first substrate, and respectively extend along a first extending direction and a second extending direction. Each of the active elements is electrically connected to a corresponding one of the first signal lines and a corresponding one of the second signal lines. The pixel electrodes are electrically connected to the active elements. The second substrate faces the first substrate. The black matrix is located on the second substrate. The black matrix includes a plurality of first portions and a plurality of second portions. The first portions extend along the first extending direction and overlap the first signal lines in a direction perpendicular to the first substrate, and a center line of each of the first portions substantially extends along a corresponding one of the first signal lines. The second portions extend along the second extending direction and overlap the second signal lines in the direction perpendicular to the first substrate, and a center line of each of the second portions substantially extends along a corresponding one of the second signal lines. The first spacer overlaps a source and a drain of one of the active elements in the direction perpendicular to the first substrate. The second spacer overlaps a source and a drain of another one of the active elements in the direction perpendicular to the first substrate. A shortest distance between the center of the first spacer and the center line of a closest one of the first portions is different from a shortest distance between a center of the second spacer and the center line of a closest one of the first portions.

At least one embodiment of the disclosure provides a display device. The display device includes a first substrate, a second substrate, a plurality of first signal lines, a plurality of second signal lines, a plurality of active elements, a plurality of pixel electrodes, a first common signal line, a second common signal line, a first connection pad, a second connection pad and a common electrode. The plurality of first signal lines and the plurality of second signal lines are located on the first substrate, and respectively extend along a first extending direction and a second extending direction. Each of the active elements is electrically connected to a corresponding one of the first signal lines and a corresponding one of the second signal lines. The plurality of pixel electrodes are electrically connected to the active elements. The first common signal line and the second common signal line are located on the first substrate. The first connection pad and the second connection pad are respectively connected with the first common signal line and the second common signal line. The common electrode overlaps the pixel electrodes in a direction perpendicular to the first substrate. The common electrode is electrically connected with the first connection pad through a first through hole. The common electrode is electrically connected with the second connection pad through a second through hole. A center of the first through hole is deviated from a center of the first connection pad along a first offset direction. A center of the second through hole is deviated from a center of the second connection pad along a second offset direction. The second substrate faces the first substrate.

In order to make the aforementioned and other objectives and advantages of the disclosure comprehensible, embodiments accompanied with figures are described in detail below.

DESCRIPTION OF THE EMBODIMENTS

Figure 1A:
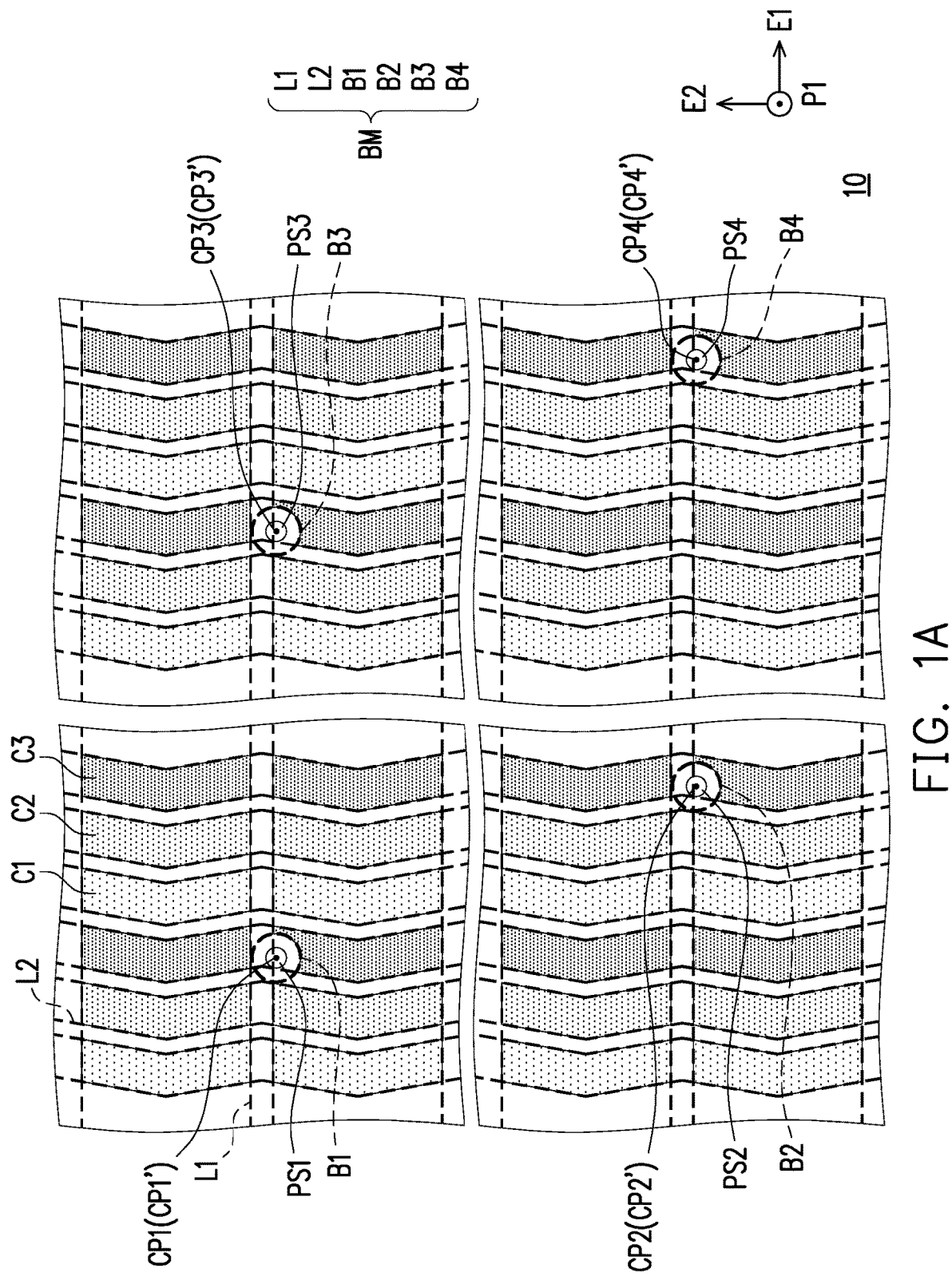
FIG. 1A is a partial top view of a display device according to an embodiment of the disclosure.
Figure 1B:
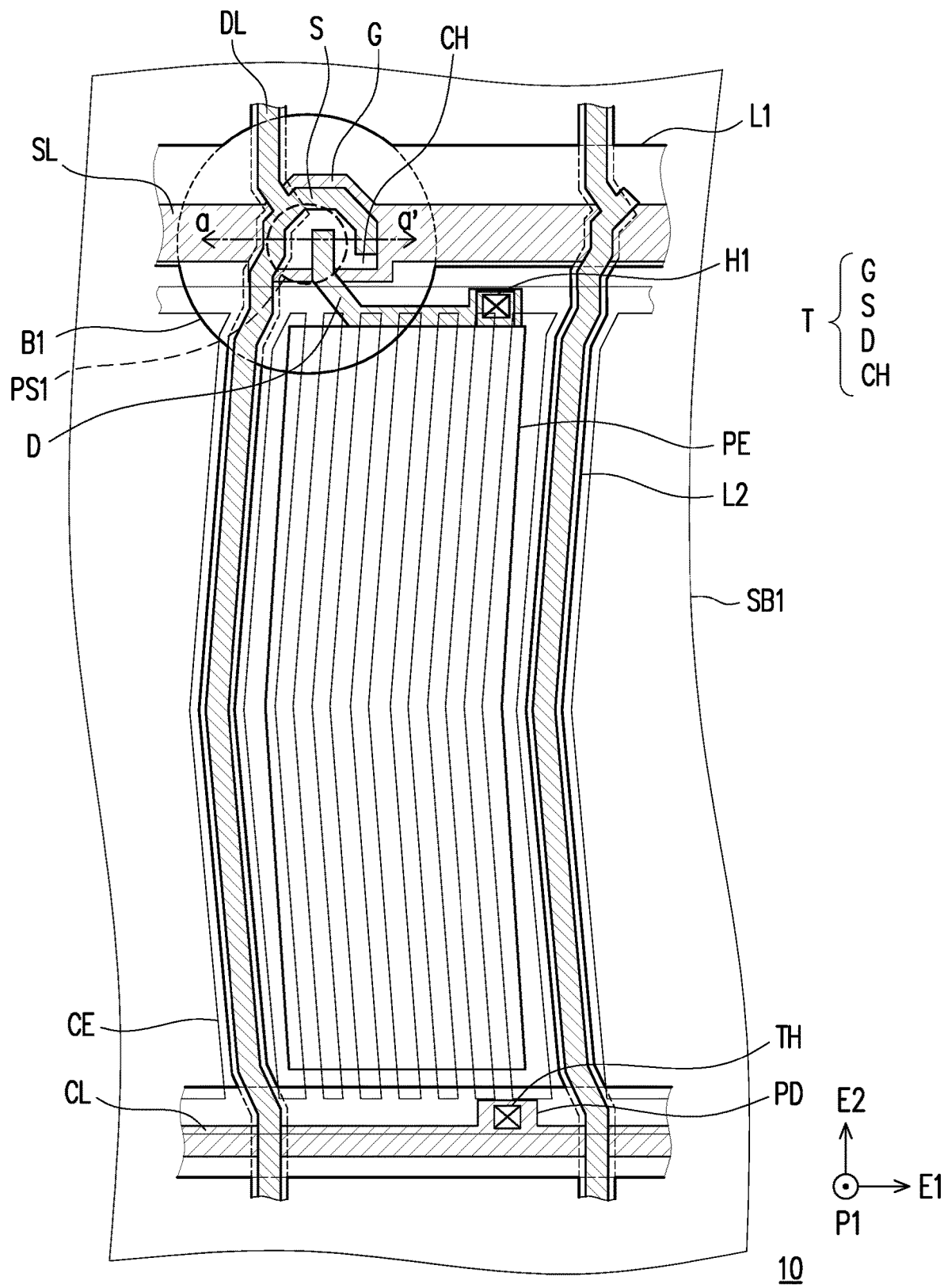
FIG. 1B is an enlarged view of some components of the display device of FIG. 1A.
Figure 1C:
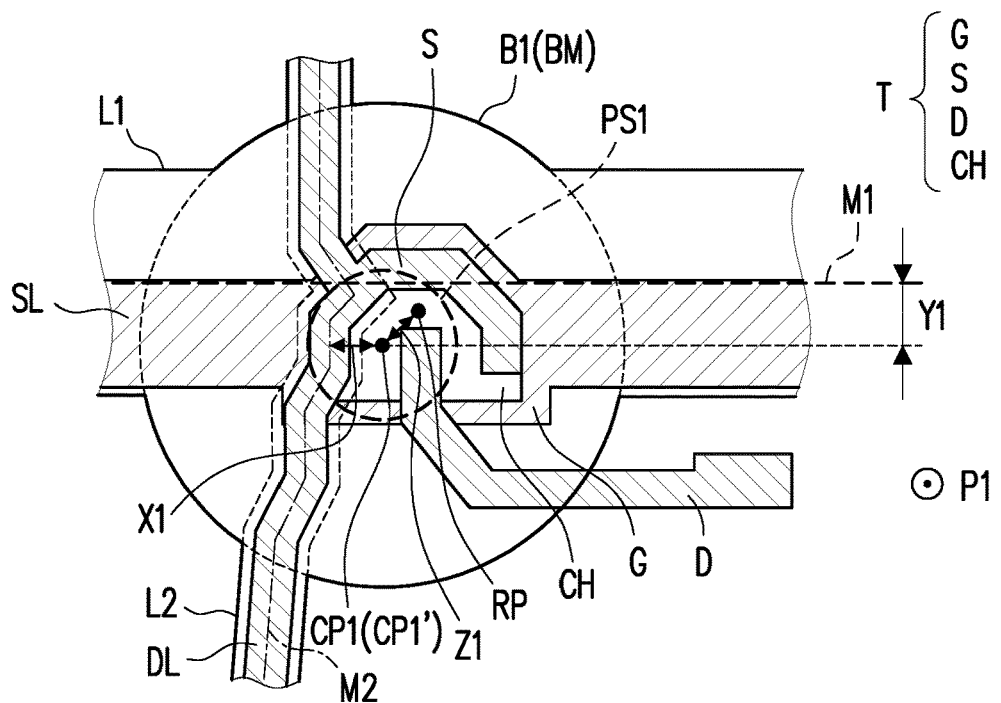
FIG. 1C is a partially enlarged view of the display device of FIG. 1B.
Figure 1D:
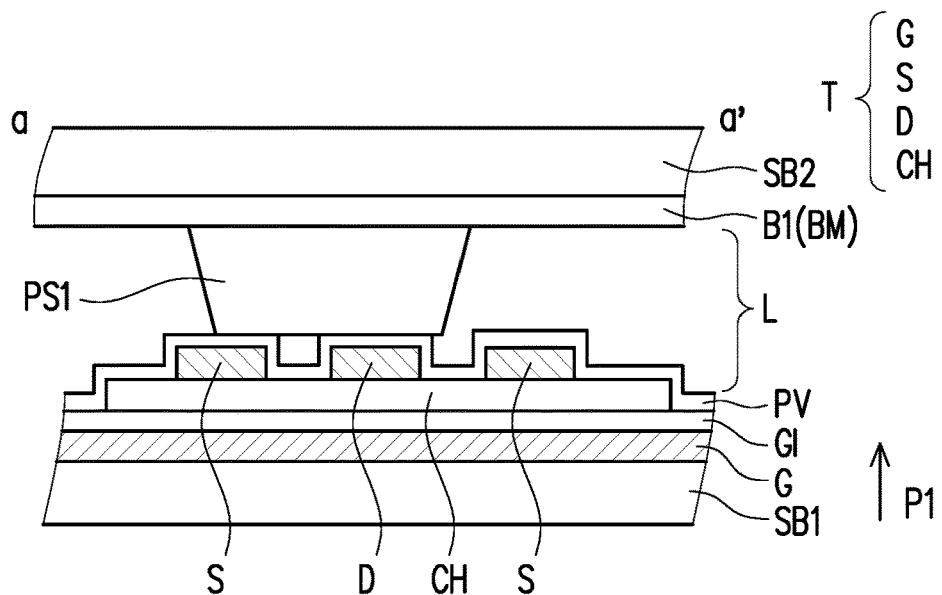
FIG. 1D is a cross-sectional view along a split line aa' of FIG. 1B.
Figure 1E:
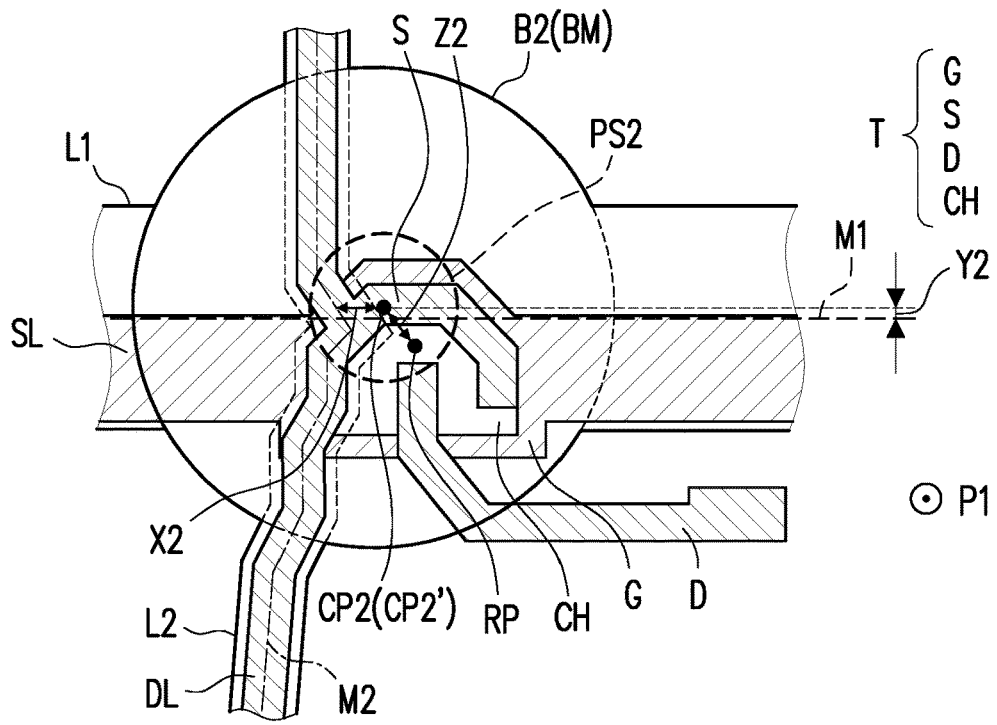
FIG. 1E is an enlarged view of some components of the display device of FIG. 1A.
Figure 1F:
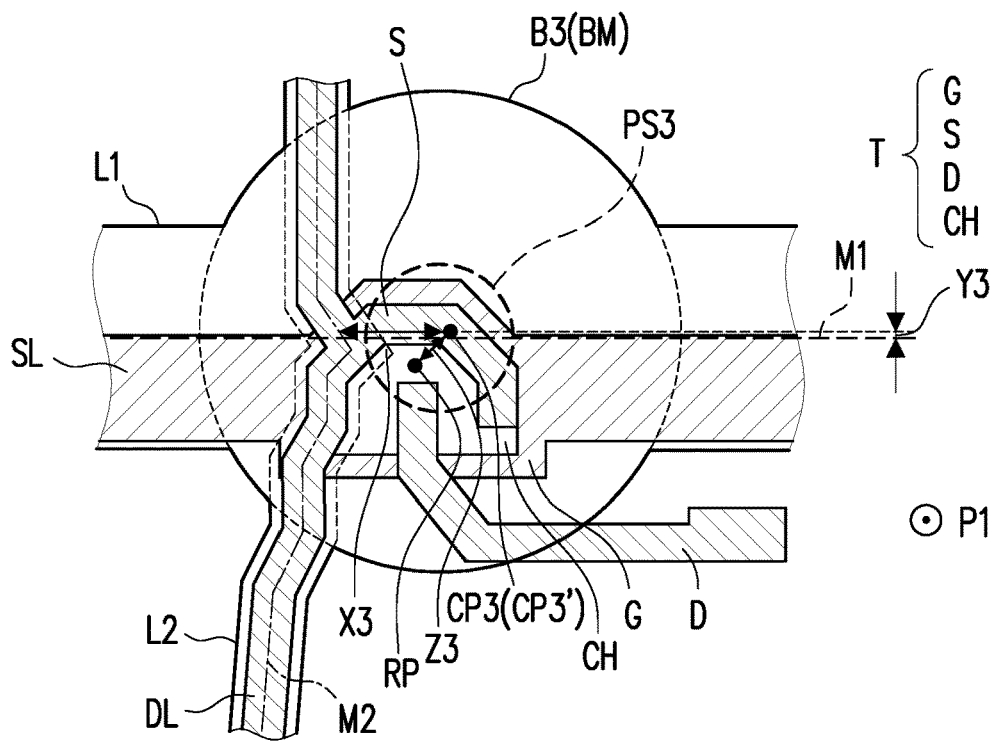
FIG. 1F is an enlarged view of some components of the display device of FIG. 1A.
Figure 1G:
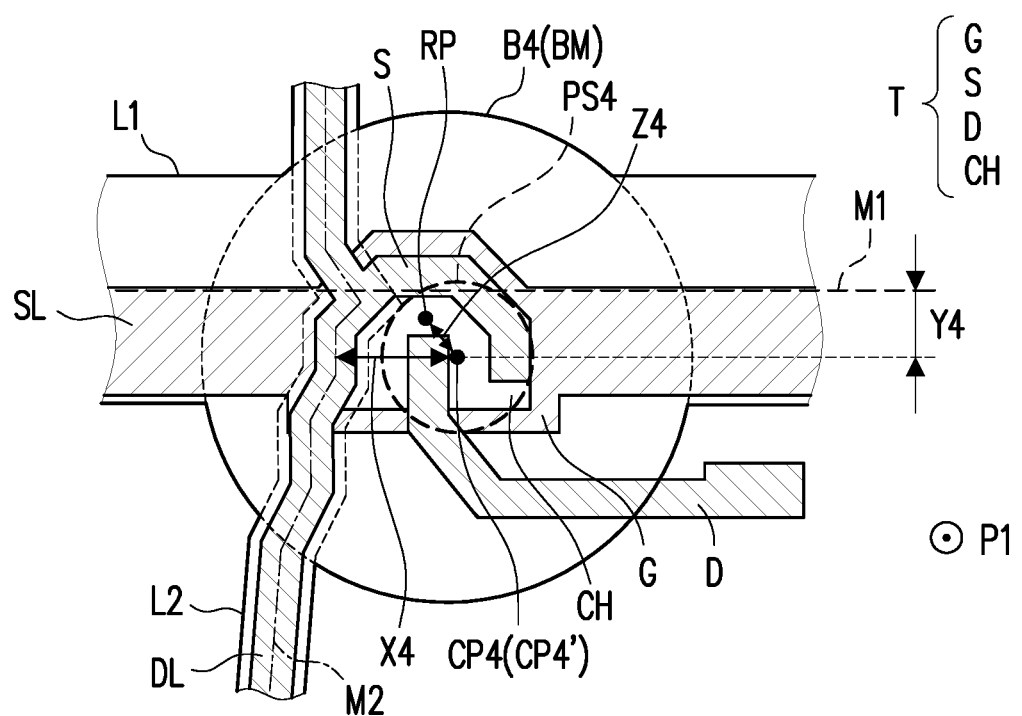
FIG. 1G is an enlarged view of some components of the display device of FIG. 1A.

FIG. 1A is a top view of a display device according to an embodiment of the disclosure. FIG. 1B is a partially enlarged view of the display device of FIG. 1A. FIG. 1C is an enlarged view of some components of the display device of FIG. 1B. FIG. 1D is a cross-sectional view along a split line aa' of FIG. 1B. FIG. 1E is a partially enlarged view of the display device of FIG. 1A. FIG. 1F is an enlarged view of some components of the display device of FIG. 1A. FIG. 1G is an enlarged view of some components of the display device of FIG. 1A. In order to facilitate the description, some components of the display device are omitted in FIGS. 1A to 1G respectively.

Referring to FIGS. 1A to 1D, FIG. 1B corresponds to, for example, one sub pixel of FIG. 1A.

The display device 10 includes a first substrate SB1, a plurality of first signal lines SL and a plurality of second signal lines DL, a plurality of active elements T, a plurality of pixel electrodes PE, a second substrate SB2, a black matrix BM, a first spacer PS1 and a second spacer PS2. In the present embodiment, the display device 10 further includes a protective layer PV, a display medium L, a plurality of blue filters C3, a plurality of green filters C2, a plurality of red filters C1, a common signal line CL, a connection pad PD, a common electrode CE, a third spacer PS3 and a fourth spacer PS4.

The plurality of first signal lines SL and the plurality of second signal lines DL are located on the first substrate SB1, and respectively extend along a first extending direction E1 and a second extending direction E2.

Each of the active elements T is electrically connected to a corresponding one of the first signal lines SL and a corresponding one of the second signal lines DL. In the present embodiment, the active elements T are located on the first substrate SB1. The active elements T include channel layers CH, gates G, sources S and drains D. Each of the gates G is electrically connected to a corresponding one of the first signal lines SL. The gates G overlap the channel layers CH in a direction P1 perpendicular to the first substrate SB1, and gate insulating layers GI are sandwiched between the gates G and the channel layers CH. The sources S and the drains D are located on the channel layers CH, and are respectively electrically connected to the channel layers CH. Each of the sources S is electrically connected to a corresponding one of the second signal lines DL. In the present embodiment, the sources S and the second signal lines DL are connected to form a whole, but the disclosure is not limited thereto.

Although, in the present embodiment, the first signal lines SL are electrically connected to the gates G of the active elements T, and the second signal lines DL are electrically connected to the sources S of the active elements T, the disclosure is not limited thereto. In other embodiments, the first signal lines SL are electrically connected to the sources S of the active elements T, and the second signal lines DL are electrically connected to the gates G of the active elements T. The extending directions of the first signal lines SL and the second signal lines DL may be opposite to each other.

Although, in the present embodiment, the active elements T are exemplified by bottom gate type thin film transistors, the disclosure is not limited thereto. In other embodiments, the active elements T may also be top gate type thin film transistors or other types of thin film transistors.

The protective layer PV covers the active elements T. The protective layer PV is a single insulating layer or a plurality of insulating layers.

The pixel electrodes PE are electrically connected to the active elements T. For example, the pixel electrodes are located on the protective layer PV, and the pixel electrodes PE are electrically connected to the drains D of the active elements T through contact windows H1. The contact windows H1 penetrate through, for example, the protective layer PV, but the disclosure is not limited thereto. In other embodiments, the contact windows H1 may also penetrate through other insulating layers.

The common electrode CE overlaps the plurality of pixel electrodes PE in the direction P1 perpendicular to the first substrate SB1. In the present embodiment, a passivation layer (not shown) is sandwiched between the common electrode CE and the pixel electrodes PE. The common electrode CE is provided with a plurality of slits.

In the present embodiment, the common signal line CL and the connection pad PD are located on the first substrate SB1. The connection pad PD is connected with the common signal line CL. In the present embodiment, the common signal line CL and the connection pad PD are connected to form a whole. The first signal lines SL, the common signal line CL, and the connection pad PD belong to the same conductive layer, but the disclosure is not limited thereto. In other embodiments, the common signal line CL, the connection pad PD and the first signal lines SL belong to different conductive layers. The common electrode CE is electrically connected to the connection pad PD through a through hole TH. The through hole TH penetrates through, for example, the gate insulating layers GI, the protective layer PV and the passivation layer (not shown) between the common electrode CE and the pixel electrodes PE, but the disclosure is not limited thereto. In other embodiments, the through hole TH may also penetrate through other insulating layers.

The second substrate SB2 faces the first substrate SB1. The plurality of blue filters C3, the plurality of green filters C2, the plurality of red filters C1 and the black matrix BM are located on the second substrate SB2. The plurality of blue filters C3, the plurality of green filters C2, the plurality of red filters C1 and the black matrix BM are located between the first substrate SB1 and the second substrate SB2. The black matrix BM is located between the adjacent blue filters C3, green filters C2 and red filters C1.

The black matrix BM includes a plurality of first portions L1 and a plurality of second portions L2. The first portions L1 extend along the first extending direction E1 and overlap the first signal lines SL in the direction P1 perpendicular to the first substrate SB1. The center lines M1 of the first portions L1 substantially overlap the first signal lines SL in the direction P1 perpendicular to the first substrate SB1. The center line M1 of each of the first portions L1 substantially extends along the corresponding first signal line SL, but the disclosure is not limited thereto. The second portions L2 extend along the second extending direction E2 and overlap the second signal lines DL in the direction P1 perpendicular to the first substrate SB1. The center lines M2 of the second portions L2 substantially overlap the second signal lines DL in the direction P1 perpendicular to the first substrate SB1. The center line M2 of each of the second portions L2 substantially extends along the corresponding second signal line DL, but the disclosure is not limited thereto. The center lines M2 of the second portions L2 or the center lines M1 of the first portions L1 are zigzag. In the present embodiment, the second portions L2 and the second signal lines DL are zigzag, and the center lines M2 of the second portions L2 are zigzag.

In the present embodiment, the first signal lines SL are scanning lines, and the second signal lines DL are data lines. The first portions L1 cover the scanning lines, and the second portions L2 cover the data lines, but the disclosure is not limited thereto. In other embodiments, the first signal lines SL are data lines, and the second signal lines DL are scanning lines. The first portions L1 cover the data lines, and the second portions L2 cover the scanning lines.

Referring to FIGS. 1C and 1E, in the present embodiment, the black matrix BM further includes a first covering portion B1 and a second covering portion B2. The first covering portion B1 and the second covering portion B2 are located at intersections of the first portions L1 and the second portions L2.

The first spacer PS1 and the second spacer PS2 are located on the second substrate SB2. In the present embodiment, the first spacer PS1 and the second spacer PS2 are located on the black matrix BM.

The first spacer PS1 overlaps the source S and the drain D of one of the active elements T in the direction P1 perpendicular to the first substrate SB1. The second spacer PS2 overlaps the source S and the drain D of another one of the active elements T in the direction P1 perpendicular to the first substrate SB1.

The shortest distance Y1 between the center CP1 of the first spacer PS1 and the center line M1 of the closest one of the first portions L1 is different from the shortest distance Y2 between the center CP2 of the second spacer PS2 and the center line M1 of the closest one of the first portions L1. Therefore, a sum of the area that the first spacer PS1 overlaps the corresponding drain D and source S in the direction P1 perpendicular to the first substrate SB1 and the area that the second spacer PS2 overlaps the corresponding drain D and source S in the direction P1 perpendicular to the first substrate SB1 is not easily affected by an offset of the procedure of aligning the first substrate SB1 with the second substrate SB2. More specifically, even if an offset occurs during the aligning of the first substrate SB1 with the second substrate SB2, the sum of the area that the first spacer PS1 overlaps the corresponding drain D and source S in the direction P1 perpendicular to the first substrate SB1 and the area that the second spacer PS2 overlaps the corresponding drain D and source S in the direction P1 perpendicular to the first substrate SB1 may not be greatly different from an expected value implemented without the offset during the aligning, so the procedure yield of the display device 10 can be increased, and the decline in display quality due to the offset in the manufacturing procedure can be alleviated.

In some embodiments, the shortest distance X1 between the center CP1 of the first spacer PS1 and the center line M2 of the closest one of the second portions L2 is different from the shortest distance X2 between the center CP2 of the second spacer PS2 and the center line M2 of the closest one of the second portions L2. Therefore, the decline in display quality due to the offset in the manufacturing procedure can be further alleviated.

In the present embodiment, the shortest distance between the center CP1' of the first covering portion B1 and the center line M1 of the closest one of the first portions L1 is different from the shortest distance between the center CP2' of the second covering portion B2 and the center line M1 of the closest one of the first portions L1. In some embodiments, the shortest distance between the center CP1' of the first covering portion B1 and the center line M2 of the closest one of the second portions L2 is different from the shortest distance between the center CP2' of the second covering portion B2 and the center line M2 of the closest one of the second portions L2. Therefore, the first spacer PS1 and the second spacer PS2 are not easily deviated from the range of the first covering portion B1 and the second covering portion B2. In the present embodiment, the center CP1' of the first covering portion B1 overlaps the center CP1 of the first spacer PS1 in the direction P1 of the first substrate SB1, and the center CP2' of the second covering portion B2 overlaps the center CP2 of the second spacer PS2 in the direction P1 of the first substrate SB1.

In the present embodiment, the shortest distance between the first spacer PS1 and the blue filters C3 is shorter than the shortest distance between the first spacer PS1 and the green filters C2 or the red filters C1, and the shortest distance between the second spacer PS2 and the blue filters C3 is shorter than the shortest distance between the second spacer PS2 and the green filters C2 or the red filters C1. The shortest distance refers to the shortest distance between the edge of the spacer and the edge of the element. In other words, the first spacer PS1 and the second PS2 are located between the blue filters C3 and the green filters C2 or between the blue filters C3 and the red filters C1. Therefore, the influence caused by the first spacer PS1 and the second spacer PS2 on the brightness of the display device 10 can be relieved.

In the present embodiment, the shortest distance between the first covering portion B1 and the blue filters C3 is shorter than the shortest distance between the first covering portion B1 and the green filters C2 or the red filters C1, and the shortest distance between the second covering portion B2 and the blue filters C3 is shorter than the shortest distance between the second covering portion B2 and the green filters C2 or the red filters C1. The aforementioned shortest distance refers to the shortest distance between the edge of the spacer and the edge of the element.

Referring to FIGS. 1F and 1G, in the present embodiment, the black matrix BM may optionally include a third covering portion B3 and a fourth covering portion B4. The third covering portion B3 and the fourth covering portion B4 are located at intersections of the first portions L1 and the second portions L2.

The display device 10 may optionally include a third spacer PS3 and a fourth spacer PS4. The third spacer PS3 and the fourth spacer PS4 are located on the second substrate SB2. In the present embodiment, the third spacer PS3 and the fourth spacer PS4 are located on the black matrix BM.

The third spacer PS3 overlaps the source S and the drain D of one of the active elements T in the direction P1 perpendicular to the first substrate SB1. The fourth spacer PS4 overlaps the source S and the drain D of another one of the active elements T in the direction P1 perpendicular to the first substrate SB1.

The shortest distance Y3 between the center CP3 of the third spacer PS3 and the center line M1 of the closest one of the first portions L1 is different from the shortest distance Y4 between the center CP4 of the fourth spacer PS4 and the center line M1 of the closest one of the first portions L1. Therefore, a sum of the area that the third spacer PS3 overlaps the corresponding drain D and source S in the direction P1 perpendicular to the first substrate SB1 and the area that the fourth spacer PS4 overlaps the corresponding drain D and source S in the direction P1 perpendicular to the first substrate SB1 is not easily affected by an offset of the procedure of aligning the first substrate SB1 with the second substrate SB2. More specifically, even if an offset occurs during the aligning of the first substrate SB1 with the second substrate SB2, the sum of the area that the third spacer PS3 overlaps the corresponding drain D and source S in the direction P1 perpendicular to the first substrate SB1 and the area that the fourth spacer PS4 overlaps the corresponding drain D and source S in the direction P1 perpendicular to the first substrate SB1 may not be greatly different from the expected value, so the procedure yield of the display device 10 can be increased, and the decline in display quality due to the offset in the manufacturing procedure can be alleviated.

In some embodiments, the shortest distance X3 between the center CP3 of the third spacer PS3 and the center line M2 of the closest one of the second portions L2 is different from the shortest distance X4 between the center CP4 of the fourth spacer PS4 and the center line M2 of the closest one of the second portions L2. Therefore, the decline in display quality due to the offset in the manufacturing procedure can be further alleviated.

In the present embodiment, the shortest distance between the center CP3' of the third covering portion B3 and the center line M1 of the closest one of the first portions L1 is different from the shortest distance between the center CP4' of the fourth covering portion B4 and the center line M1 of the closest one of the first portions L1. In some embodiments, the shortest distance between the center of the third covering portion B3 and the center line M2 of the closest one of the second portions L2 is different from the shortest distance between the center of the fourth covering portion B4 and the center line M2 of the closest one of the second portions L2. Therefore, the third spacer PS3 and the fourth spacer PS4 are not easily deviated from the range of the third covering portion B3 and the fourth covering portion B4. In the present embodiment, the center of the third covering portion B3 overlaps the center of the third spacer PS3 in the direction P1 perpendicular to the first substrate SB1, and the center of the fourth covering portion B4 overlaps the center of the fourth spacer PS4 in the direction P1 perpendicular to the first substrate SB1.

Referring to FIGS. 1C, 1E, 1F and 1G at the same time, in the present embodiment, the first spacer PS1, the second spacer PS2, the third spacer PS3 and the fourth spacer PS4 are circular, and the center CP1, the center CP2, the center CP3 and the center CP4 are respectively located at the circle centers of the first spacer PS1, the second spacer PS2, the third spacer PS3 and the fourth spacer PS4, but the disclosure is not limited thereto. In other embodiments, the first spacer PS1, the second spacer PS2, the third spacer PS3 and the fourth spacer PS4 are elliptical, polygonal or of other shapes, and the center CP1, the center CP2, the center CP3 and the center CP4 are respectively located at the geometrical centers of the first spacer PS1, the second spacer PS2, the third spacer PS3 and the fourth spacer PS4.

In the present embodiment, reference points RP are provided between the sources S and the drains D of the respective active elements T. In the direction P1 perpendicular to the first substrate SB1, the center CP1 of the first spacer PS1 is located at the bottom left relative to the reference point RP of one of the active elements T, and a distance between the center CP1 of the first spacer PS1 and the reference point RP of one of the active elements T is Z1. In the direction P1 perpendicular to the first substrate SB1, the center CP2 of the second spacer PS2 is located at the top left relative to the reference point RP of another one of the active elements T, and a distance between the center CP2 of the second spacer PS2 and the reference point RP of another one of the active elements T is Z2. In the direction P1 perpendicular to the first substrate SB1, the center CP3 of the third spacer PS3 is located at the top right relative to the reference point RP of yet another of the active elements T, and a distance between the center CP3 of the third spacer PS3 and the reference point RP of the further one of the active elements T is Z3. In the direction P1 perpendicular to the first substrate SB1, the center CP4 of the fourth spacer PS4 is located at the bottom right relative to the reference point RP of still another of the active elements T, and a distance between the center CP4 of the fourth spacer PS4 and the reference point RP of another one of the active elements T is Z4.

In the present embodiment, the center CP1, the center CP2, the center CP3 and the center CP4 are respectively deviated from the corresponding reference points RP by substantially equal distances, that is, the distance Z1, the distance Z2, the distance Z3 and the distance Z4 are approximately equal, but the disclosure is not limited thereto. In other embodiments, the center CP1, the center CP2, the center CP3 and the center CP4 are respectively deviated from the corresponding reference points RP by different distances.

In some embodiments, the display device further includes a plurality of secondary spacers (not shown) that do not overlap the active elements T in the direction P1 perpendicular to the first substrate SB1, so that cell gaps can be distributed more uniformly. The secondary spacers overlap, for example, the first signal lines SL in the direction P1 perpendicular to the first substrate SB1, but the disclosure is not limited thereto.

Figure 2:
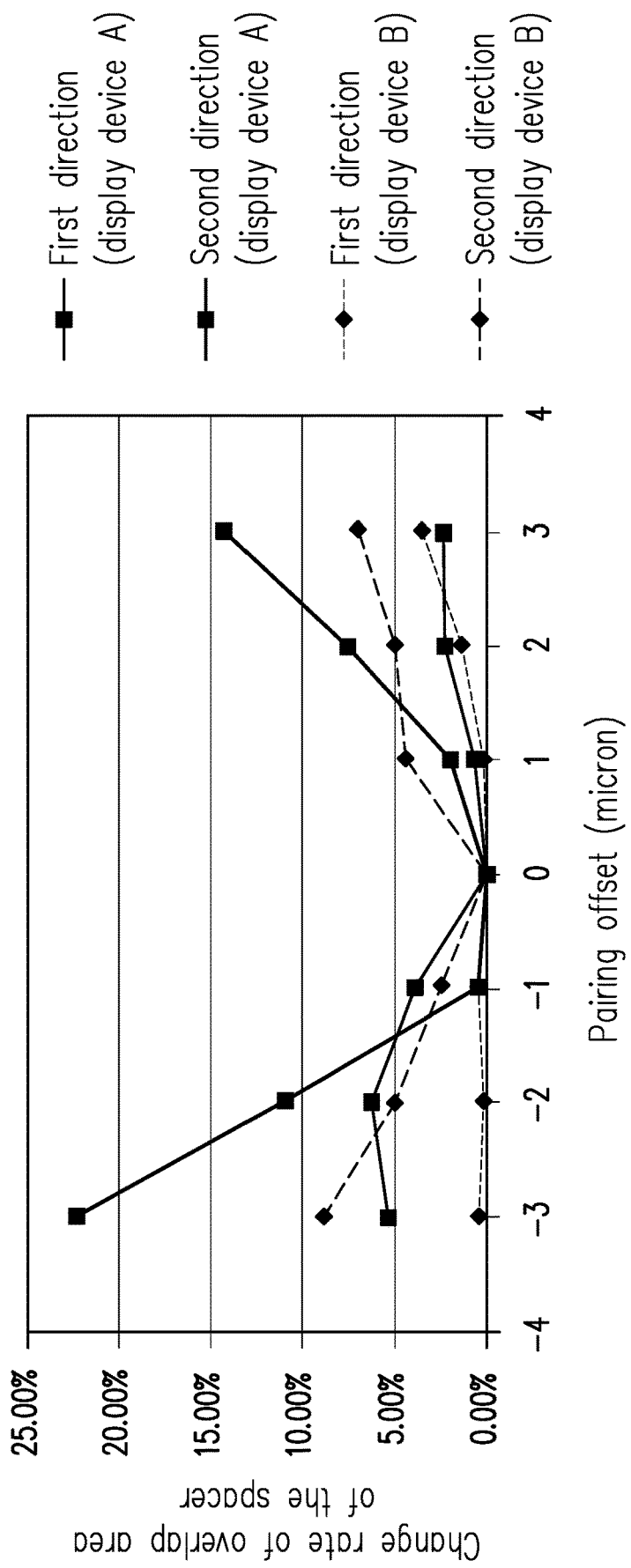
FIG. 2 is a broken line graph of an alignment offset relative to a spacer overlapped area change rate of a display device according to an embodiment of the disclosure.

FIG. 2 is a broken line graph of an alignment offset relative to a spacer overlapped area change rate in a direction perpendicular to a first substrate of a display device according to an embodiment of the disclosure. Based on no offset during the aligning of a first substrate with a second substrate, the vertical axis represents a change rate of the area that spacers (for example, including the first to fourth spacers) overlap sources and drains of active elements and second signal lines in the direction perpendicular to the first substrate, and the horizontal axis represents an alignment offset of the first substrate and the second substrate.

In FIG. 2, the display device B is, for example, the display device 10 in the embodiments of FIGS. 1A to 1G. The difference between a display device A and the display device B is that: in the display device A, the relative positions between each spacer and first portions of a black matrix are all the same, and the relative positions between each spacer and second portions of the black matrix are all the same. In other words, the display device A does not alleviate the decline in display quality due to the offset in the manufacturing procedure by adjusting the positions of the spacers.

Referring to FIG. 2, even if the first substrate and the second substrate are deviated from predetermined positions in a first direction and a second direction during aligning, the area that the spacers (for example, including the first to fourth spacers) of the display device B overlap the sources and the drains of the active elements and the second signal lines in the direction perpendicular to the first substrate may still maintain a relatively small change rate. In other words, the display device B has a larger manufacture margin than the display device A. In the present embodiment, the first direction is, for example, an extending direction of scanning lines, and the second direction is, for example, an extending direction of data lines.

Figure 3:
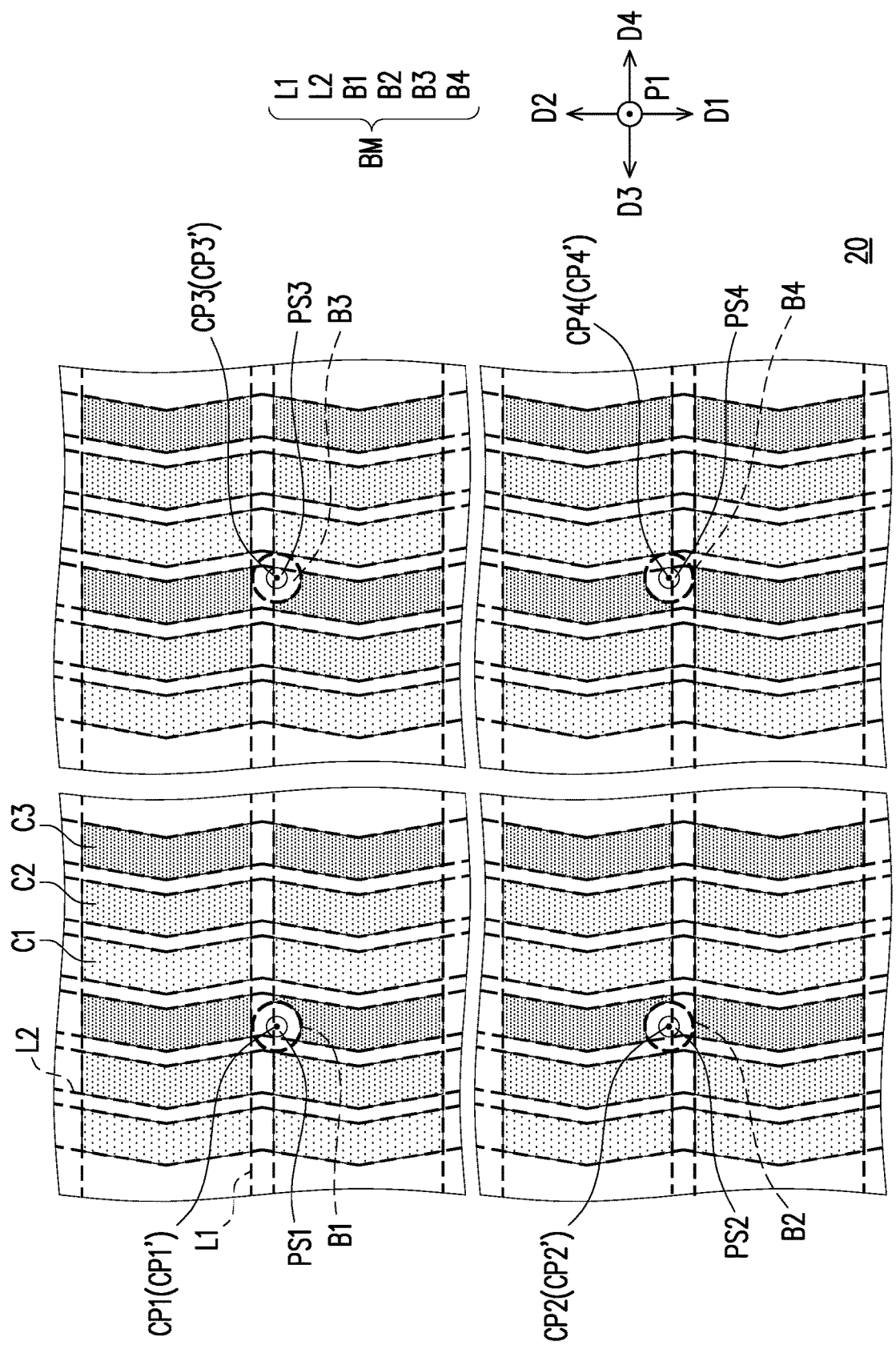
FIG. 3 is a partial top view of a display device according to an embodiment of the disclosure.

FIG. 3 is a partial top view of a display device according to an embodiment of the disclosure. The embodiment of FIG. 3 uses the element reference numerals and partial contents of the embodiment of FIG. 1A. The same or similar reference numerals are used to express the same or similar elements, and the description of the same technical content is omitted. For the descriptions of the omitted parts, reference is directed to the aforementioned embodiment, and will not be repeated in the following.

Referring to FIG. 3, in a display device 20 of the present embodiment, the center CP1' of the first covering portion B1, the center CP1 of the first spacer PS1, the center CP3' of the third covering portion B3 and the center CP3 of the third spacer PS3 are deviated from the center line of a corresponding one or the closest one of the first portions L1 along a first direction D1. The center CP2' of the second covering portion B2, the center CP2 of the second spacer PS2, the center CP4' of the fourth covering portion B4 and the center CP4 of the fourth spacer PS4 are deviated from the center line of a corresponding one or the closest one of the first portions L1 along a second direction D2.

The center CP3' of the third covering portion B3, the center CP3 of the third spacer PS3, the center CP4' of the fourth covering portion B4 and the center CP4 of the fourth spacer PS4 are deviated from the center line of a corresponding one or the closest one of the second portions L2 along a third direction D3. The center CP1' of the first covering portion B1, the center CP1 of the first spacer PS1, the center CP2' of the second covering portion B2 and the center CP2 of the second spacer PS2 are deviated from the center line of a corresponding one or the closest one of the second portions L2 along a fourth direction D4.

In the present embodiment, the first covering portion B1, the second covering portion B2, the third covering portion B3 and the fourth covering portion B4 are circular, and the center CP1', the center CP2', the center CP3' and the center CP4' are respectively located at the circle centers of the first covering portion B1, the second covering portion B2, the third covering portion B3 and the fourth covering portion B4, but the disclosure is not limited thereto. In other embodiments, the first covering portion B1, the second covering portion B2, the third covering portion B3 and the fourth covering portion B4 are elliptical, polygonal or of other shapes, and the center CP1', the center CP2', the center CP3' and the center CP4' are respectively located at the geometrical centers of the first covering portion B1, the second covering portion B2, the third covering portion B3 and the fourth covering portion B4.

In the present embodiment, the center CP1 of the first spacer PS1, the center CP2 of the second spacer PS2, the center CP3 of the third spacer PS3 and the center CP4 of the fourth spacer PS4 respectively overlap the center CP1' of the first covering portion B1, the center CP2' of the second covering portion B2, the center CP3' of the third covering portion B3 and the center CP4' of the fourth covering portion B4 in the direction P1 perpendicular to the first substrate SB1.

Based on the above, the adjustment of the deviation directions of the first spacer PS1, the second spacer PS2, the third spacer PS3 and the fourth spacer PS4 relative to the black matrix may increase the procedure yield and alleviate the decline in display quality due to the offset in the manufacturing procedure.

Figure 4:
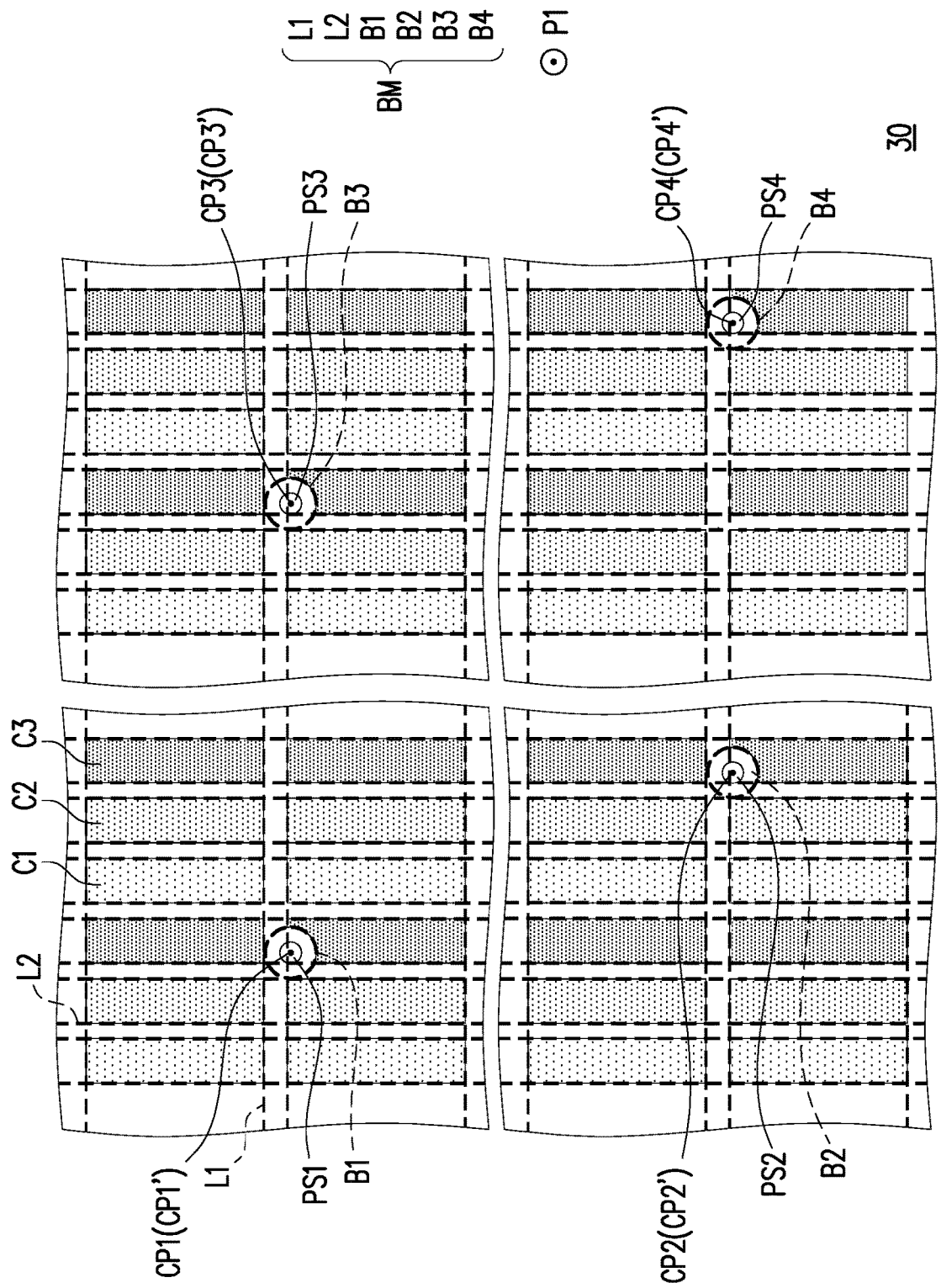
FIG. 4 is a partial top view of a display device according to an embodiment of the disclosure.

FIG. 4 is a partial top view of a display device according to an embodiment of the disclosure. The embodiment of FIG. 4 uses the element reference numerals and partial contents of the embodiment of FIG. 1A. The same or similar reference numerals are used to express the same or similar elements, and the description of the same technical content is omitted. For the descriptions of the omitted parts, reference is directed to the aforementioned embodiment, and will not be repeated in the following.

A main difference between a display device 30 of FIG. 4 and the display device 10 of FIG. 1A is that: in the display device 30, the second portions L2 of the black matrix BM are of a linear shape.

Figure 5:
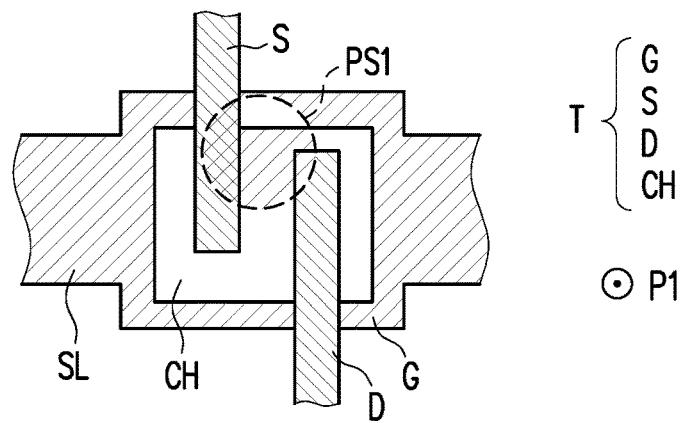
FIG. 5 is a partial top view of a display device according to an embodiment of the disclosure.

FIG. 5 is a partial top view of a display device according to an embodiment of the disclosure. The embodiment of FIG. 5 uses the element reference numerals and partial contents of the embodiment of FIG. 1A. The same or similar reference numerals are used to express the same or similar elements, and the description of the same technical content is omitted. For the descriptions of the omitted parts, reference is directed to the aforementioned embodiment, and will not be repeated in the following.

In the embodiment of FIG. 1A, the sources S of the active elements T of the display device 10 are substantially of a U shape. In the embodiment of FIG. 5, the sources S of the active elements T of the display device are substantially of the shape of "1".

Figure 6:
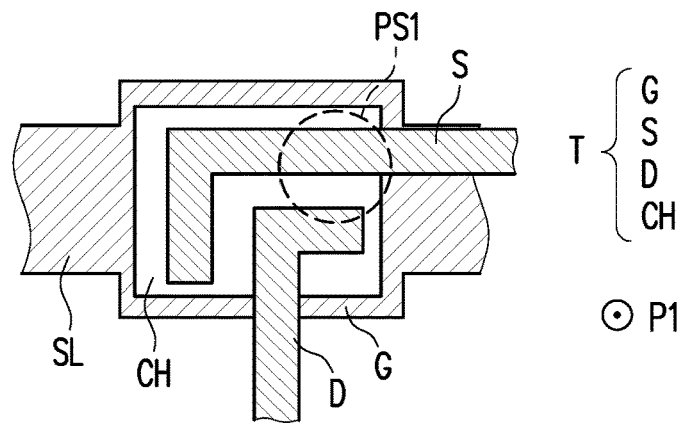
FIG. 6 is a partial top view of a display device according to an embodiment of the disclosure.

FIG. 6 is a partial top view of a display device according to an embodiment of the disclosure. The embodiment of FIG. 6 uses the element reference numerals and partial contents of the embodiment of FIG. 1A. The same or similar reference numerals are used to express the same or similar elements, and the description of the same technical content is omitted. For the descriptions of the omitted parts, reference is directed to the aforementioned embodiment, and will not be repeated in the following.

In the embodiment of FIG. 6, the sources S of the active elements T of the display device are substantially of an L shape.

Figure 7:
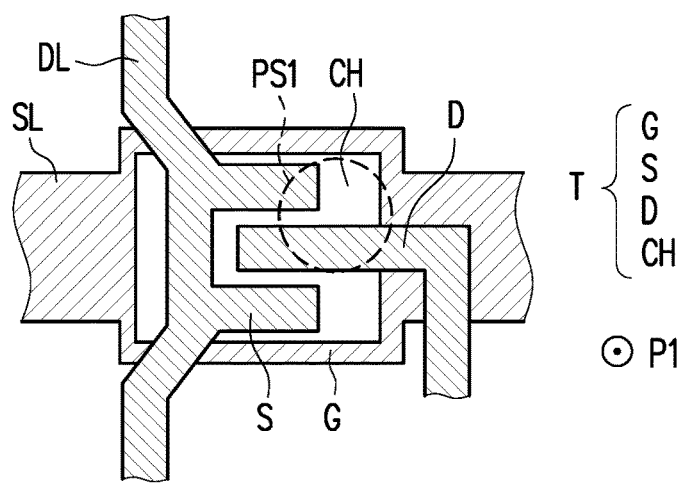
FIG. 7 is a partial top view of a display device according to an embodiment of the disclosure.

FIG. 7 is a partial top view of a display device according to an embodiment of the disclosure. The embodiment of FIG. 7 uses the element reference numerals and partial contents of the embodiment of FIG. 1A. The same or similar reference numerals are used to express the same or similar elements, and the description of the same technical content is omitted. For the descriptions of the omitted parts, reference is directed to the aforementioned embodiment, and will not be repeated in the following.

In the embodiment of FIG. 1A, the sources S of the active elements T of the display device 10 are substantially of a U shape, and the orientation of the opening of the U shape is substantially perpendicular to the extending direction of the first signal lines SL. In the embodiment of FIG. 7, the sources S of the active elements T of the display device are substantially of a U shape, and the orientation of the opening of the U shape is substantially parallel to the extending direction of the first signal lines SL.

Figure 8A:
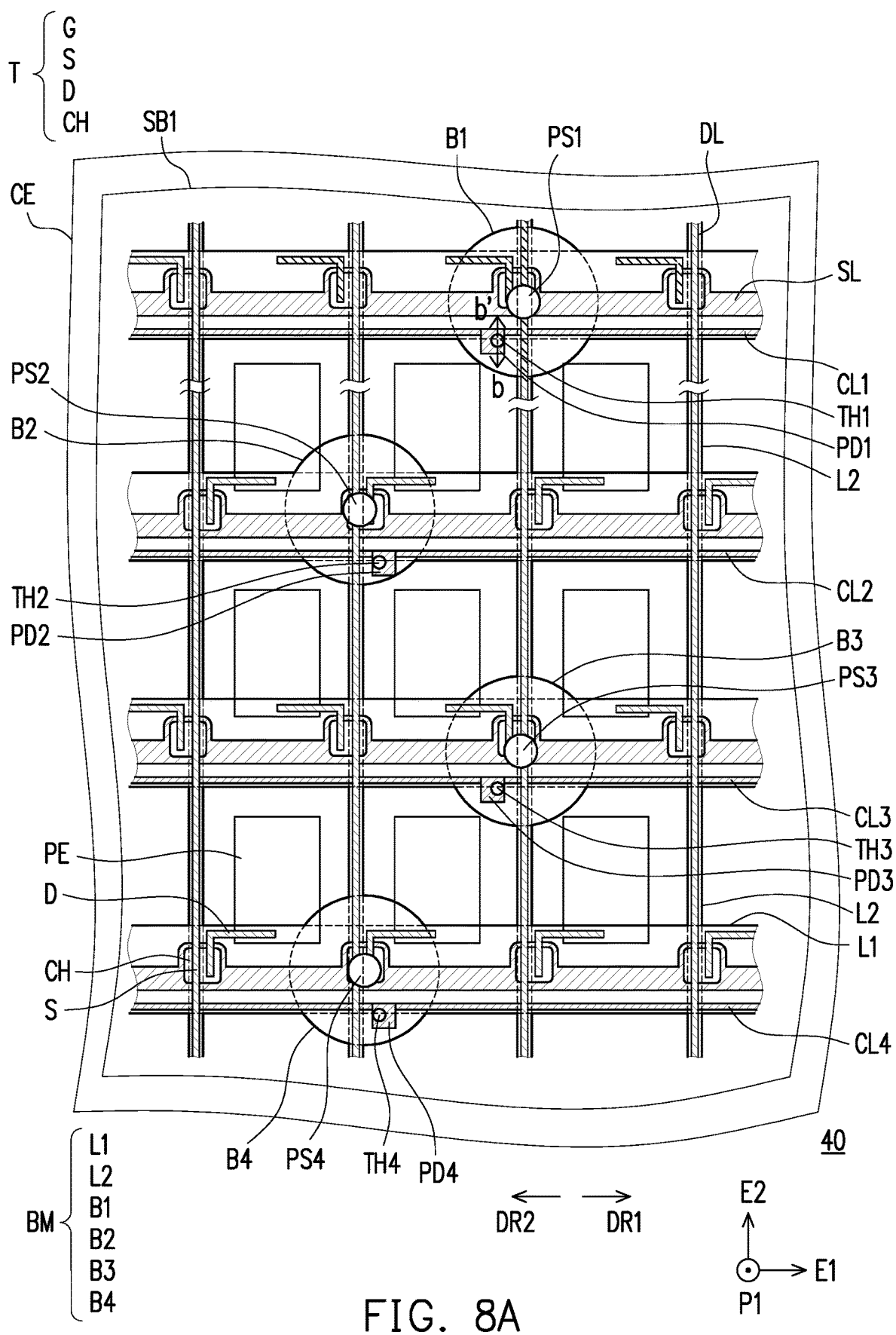
FIG. 8A is a partial top view of a display device according to an embodiment of the disclosure.
Figure 8B:
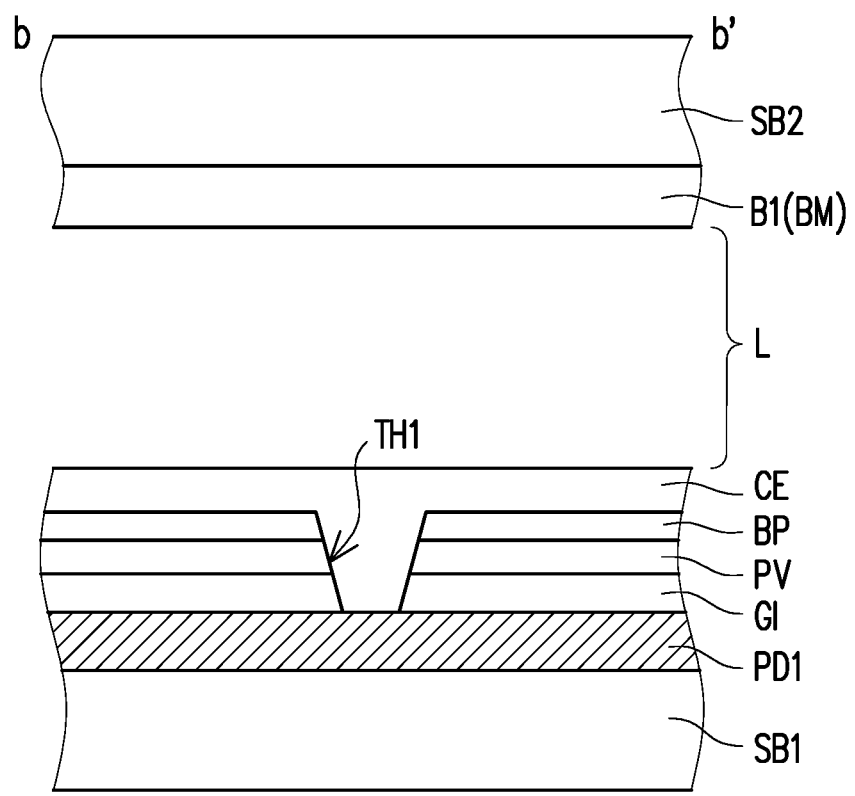
FIG. 8B is a cross-sectional view along a split line bb' of FIG. 8A.
Figure 8C:
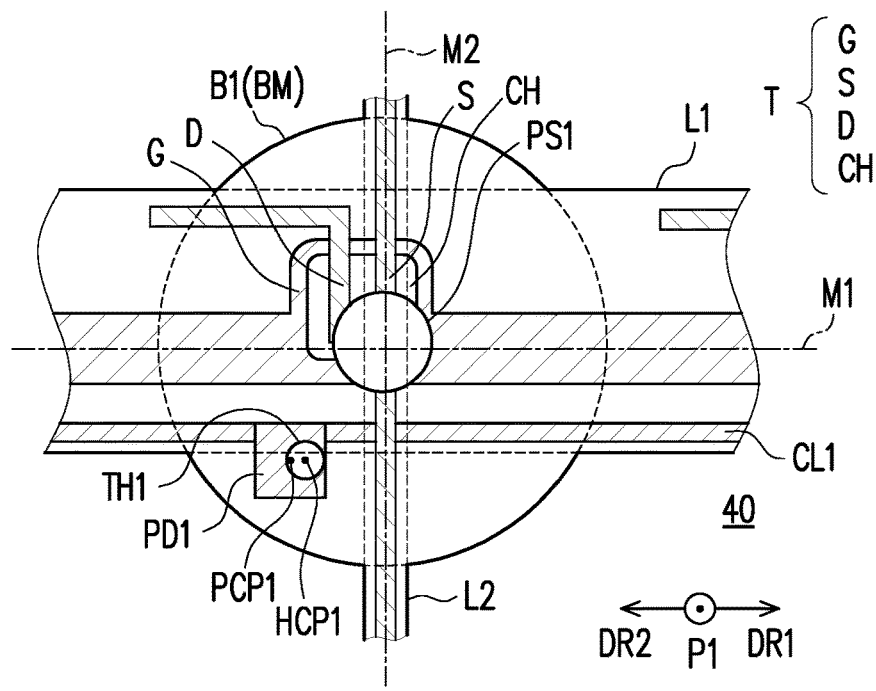
FIG. 8C is an enlarged view of some components of the display device of FIG. 8A.
Figure 8D:
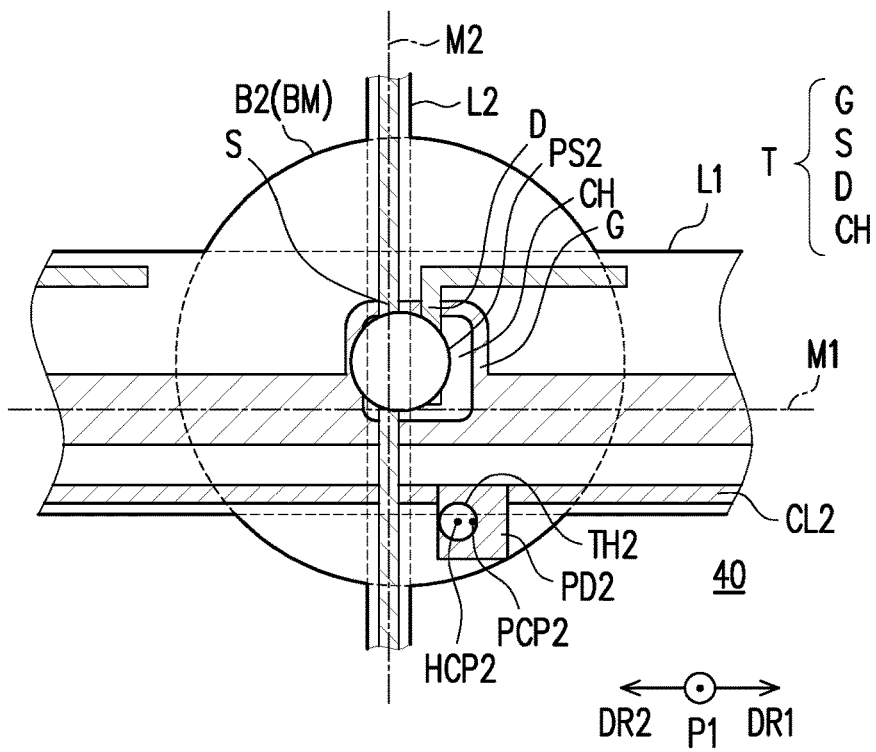
FIG. 8D is an enlarged view of some components of the display device of FIG. 8A.
Figure 8E:
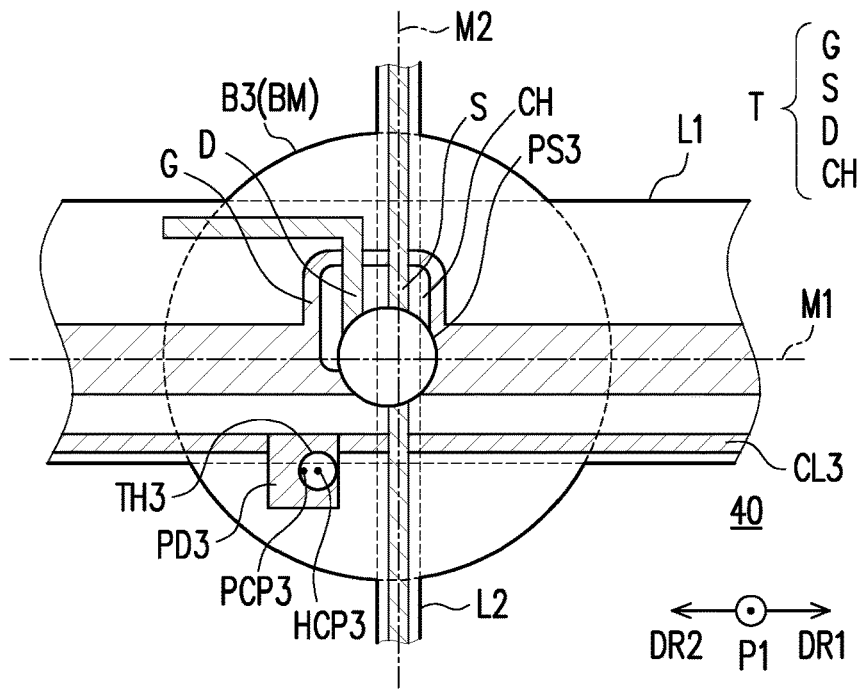
FIG. 8E is an enlarged view of some components of the display device of FIG. 8A.
Figure 8F:
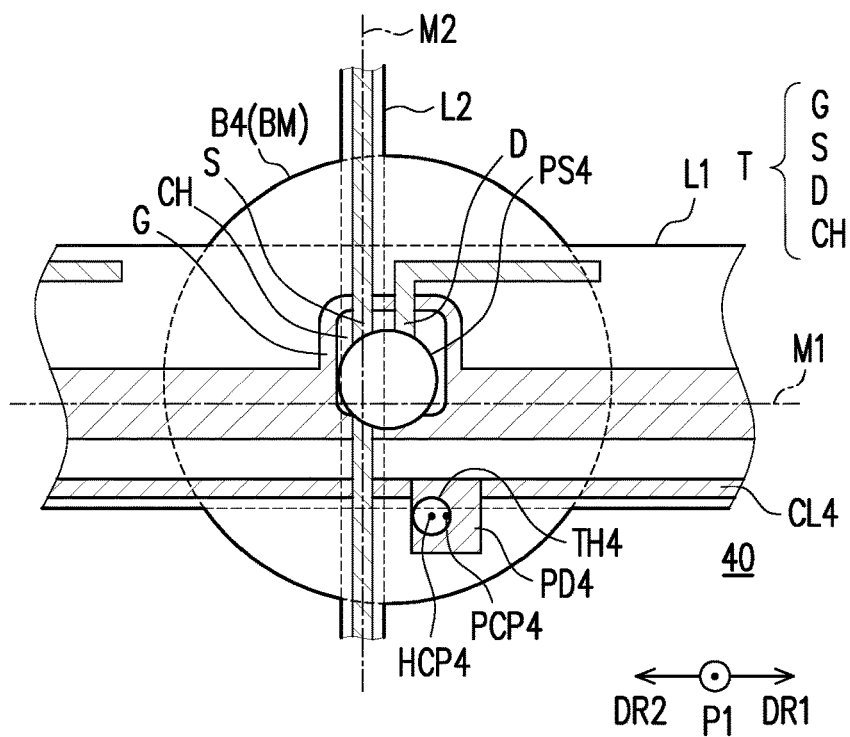
FIG. 8F is an enlarged view of some components of the display device of FIG. 8A.

FIG. 8A is a partial top view of a display device according to an embodiment of the disclosure. FIG. 8B is a cross-sectional view along a split line bb' of FIG. 8A. FIG. 8C is an enlarged view of some components of the display device of FIG. 8A. FIG. 8D is an enlarged view of some components of the display device of FIG. 8A. FIG. 8E is an enlarged view of some components of the display device of FIG. 8A. FIG. 8F is an enlarged view of some components of the display device of FIG. 8A.

The embodiments of FIGS. 8A to 8F use the element reference numerals and partial contents of the embodiment of FIG. 1A. The same or similar reference numerals are used to express the same or similar elements, and the description of the same technical content is omitted. For the descriptions of the omitted parts, reference is directed to the aforementioned embodiment, and will not be repeated in the following.

Referring to FIGS. 8A and 8B, the display device 40 includes a first substrate SB1, a second substrate SB2, a plurality of first signal lines SL, a plurality of second signal lines DL, a plurality of active elements T, a plurality of pixel electrodes PE, a first common signal line CL1, a second common signal line CL2, a first connection pad PD1, a second connection pad PD2 and a common electrode CE. In the present embodiment, the display device 40 further includes a black matrix BM, a protective layer PV, a display medium L, a passivation layer BP, a third common signal line CL3, a fourth common signal line CL4, a third connection pad PD3, a fourth connection pad PD4, a first spacer PS1, a second spacer PS2, a third spacer PS3 and a fourth spacer PS4.

The first signal lines SL and the second signal lines DL are located on the first substrate SB1, and respectively extend along a first extending direction E1 and a second extending direction E2. Each of the active elements T is electrically connected to a corresponding one of the first signal lines SL and a corresponding one of the second signal lines DL. The plurality of pixel electrodes PE are electrically connected to the active elements T.

The first common signal line CL1, the second common signal line CL2, the third common signal line CL3 and the fourth common signal line CL4 are located on the first substrate SB1. The first connection pad PD1, the second connection pad PD2, the third connection pad PD3 and the fourth connection pad PD4 are respectively connected with the first common signal line CL1, the second common signal line CL2, the third common signal line CL3 and the fourth common signal line CL4.

The common electrode CE overlaps the pixel electrodes PE in a direction P1 perpendicular to the first substrate SB1, and the passivation layer BP is sandwiched between the common electrode CE and the pixel electrodes PE. The common electrode CE is electrically connected with the first connection pad PD1 through a first through hole TH1. The common electrode CE is electrically connected with the second connection pad PD2 through a second through hole TH2. The common electrode CE is electrically connected with the third connection pad PD3 through a third through hole TH3. The common electrode CE is electrically connected with the fourth connection pad PD4 through a fourth through hole TH4.

Referring to FIG. 8C, the center HCP1 of the first through hole TH1 is deviated from the center PCP1 of the first connection pad PD1 along a first offset direction DR1. Referring to FIG. 8D, the center HCP2 of the second through hole TH2 is deviated from the center PCP2 of the second connection pad PD2 along a second offset direction DR2. Referring to FIG. 8E, the center HCP3 of the third through hole TH3 is deviated from the center PCP3 of the third connection pad PD3 along the first offset direction DR1. The center HCP4 of the fourth through hole TH4 is deviated from the center PCP4 of the fourth connection pad PD4 along the second offset direction DR2. Since the center HCP1 of the first through hole TH1 is deviated from the center PCP1 of the first connection pad PD1 along the first offset direction DR1, and the center HCP2 of the second through hole TH2 is deviated from the center PCP2 of the second connection pad PD2 along the second offset direction DR2, the common electrode CE and the first common signal line CL1 and/or the second common signal line CL2 may still be electrically connected even if an offset occurs in the procedure of forming the first through hole TH1 and the second through hole TH2. In other words, the first through hole TH1 and the second through hole TH2 have a relatively large manufacture margin. For example, even if the procedure of forming the first through hole TH1 and the second through hole TH2 has an offset along the second offset direction DR2, which refrains the second through hole TH2 from overlapping the second connection pad PD2 in the direction P1 perpendicular to the first substrate SB1, the first through hole TH1 may still overlap the first connection pad PD1 in the direction P1 perpendicular to the first substrate SB1.

The first through hole TH1, the second through hole TH2, the third through hole TH3 and the fourth through hole TH4 penetrate through, for example, gate insulating layers GI, the protective layer PV and the passivation layer BP, but the disclosure is not limited thereto. Membrane layers through which the first through hole TH1, the second through hole TH2, the third through hole TH3 and the fourth through hole TH4 penetrate may be adjusted as per actual needs.

In the present embodiment, the first offset direction DR1 and the second offset direction DR2 are opposite, but the disclosure is not limited thereto. An included angle between the first offset direction DR1 and the second offset direction DR2 may be changed as per actual needs.

In the present embodiment, the first covering portion B1 of the black matrix BM overlaps the first connection pad PD1 and the first spacer PS1 in the direction P1 perpendicular to the first substrate SB1; the second covering portion B2 overlaps the second connection pad PD2 and the second spacer PS2 in the direction P1 perpendicular to the first substrate SB1; the third covering portion B3 overlaps the third connection pad PD3 and the third spacer PS3 in the direction P1 perpendicular to the first substrate SB1; and the fourth covering portion B4 overlaps the fourth connection pad PD4 and the fourth spacer PS4 in the direction P1 perpendicular to the first substrate SB1. The covering portions that cover the spacers are used to cover the connection pads, so that the aperture ratio of the display device 40 may be increased without additionally forming other protruding structures on the outer sides of the first portions L1 of the black matrix BM to cover the connection pads.

In the present embodiment, at least part of the first spacer PS1, the second spacer PS2, the third spacer PS3 and the fourth spacer PS4 overlap the sources S and the drains D of the corresponding active elements T in the direction P1 perpendicular to the first substrate SB1.

Referring to FIGS. 8C, 8D, 8E and 8F at the same time, in the present embodiment, the first through hole TH1, the second through hole TH2, the third through hole TH3 and the fourth through hole TH4 are circular, and the center HCP1, the center HCP2, the center HCP3 and the center HCP4 are respectively located at the circle centers of the first through hole TH1, the second through hole TH2, the third through hole TH3 and the fourth through hole TH4, but the disclosure is not limited thereto. In other embodiments, the first through hole TH1, the second through hole TH2, the third through hole TH3 and the fourth through hole TH4 are elliptical, polygonal or of other shapes, and the center HCP1, the center HCP2, the center HCP3 and the center HCP4 are respectively located at the geometrical centers of the first through hole TH1, the second through hole TH2, the third through hole TH3 and the fourth through hole TH4.

In the present embodiment, the first connection pad PD1, the second connection pad PD2, the third connection pad PD3 and the fourth connection pad PD4 are rectangular, and the center PCP1, the center PCP2, the center PCP3 and the center PCP4 are respectively located at the geometrical centers of intersections of diagonal lines of the first connection pad PD1, the second connection pad PD2, the third connection pad PD3 and the fourth connection pad PD4, but the disclosure is not limited thereto. In other embodiments, the first connection pad PD1, the second connection pad PD2, the third connection pad PD3 and the fourth connection pad PD4 are circular, elliptical, polygonal or of other shapes, and the center PCP1, the center PCP2, the center PCP3 and the center PCP4 are respectively located at the geometrical centers of the first connection pad PD1, the second connection pad PD2, the third connection pad PD3 and the fourth connection pad PD4.

Figure 9A:
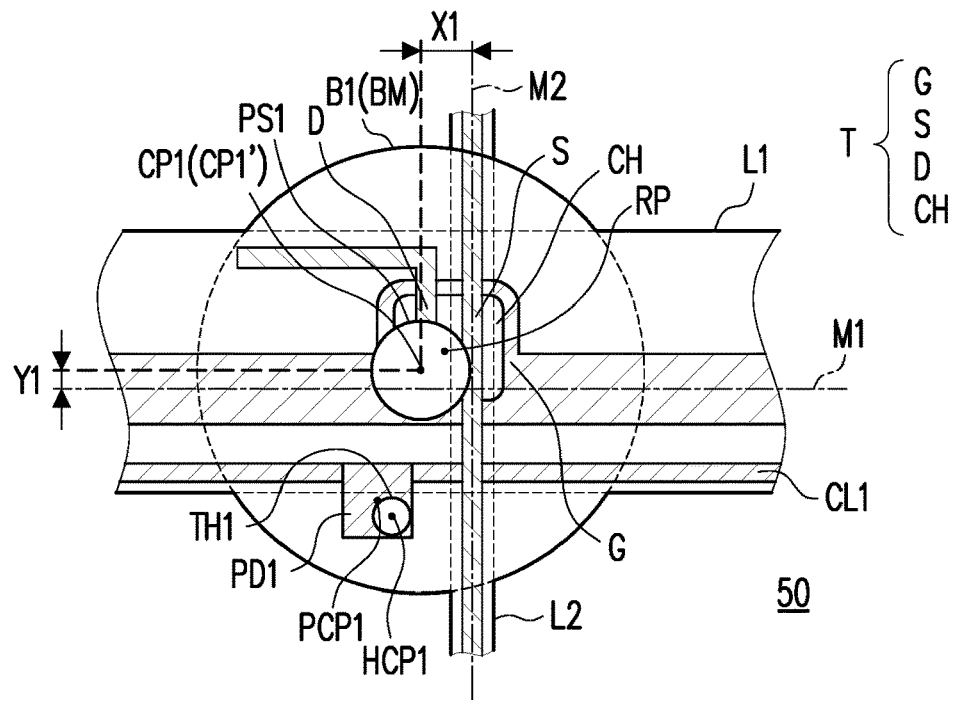
FIG. 9A is an enlarged view of some components of a display device according to an embodiment of the disclosure.
Figure 9B:
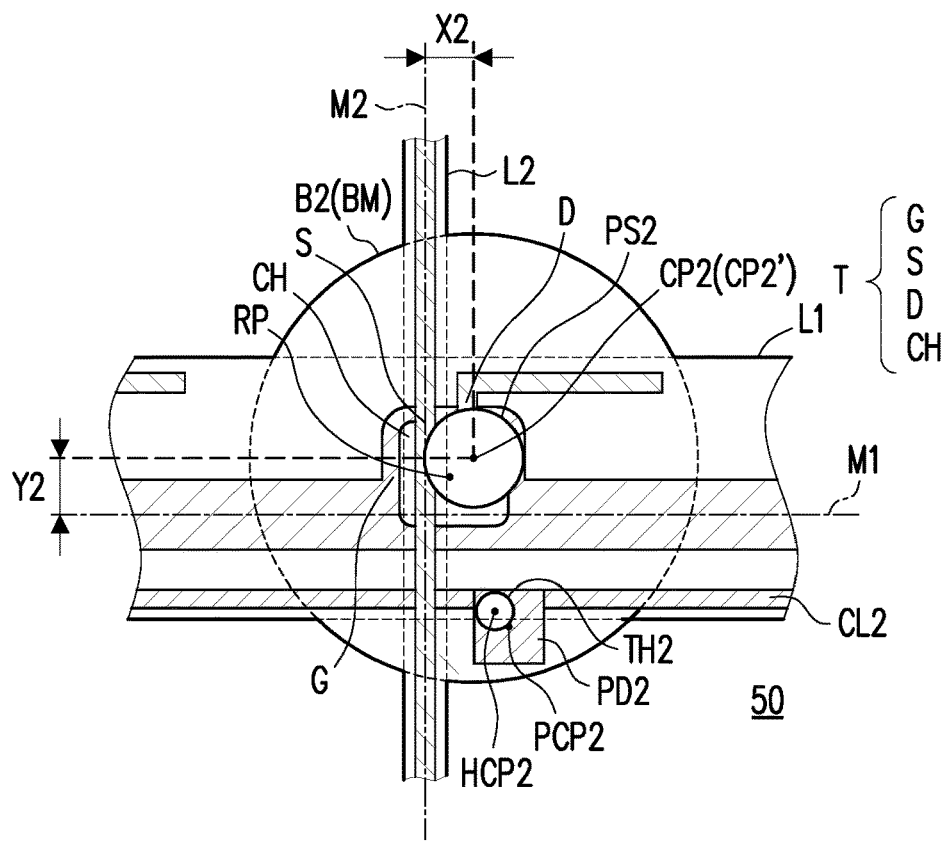
FIG. 9B is an enlarged view of some components of a display device according to an embodiment of the disclosure.
Figure 9C:
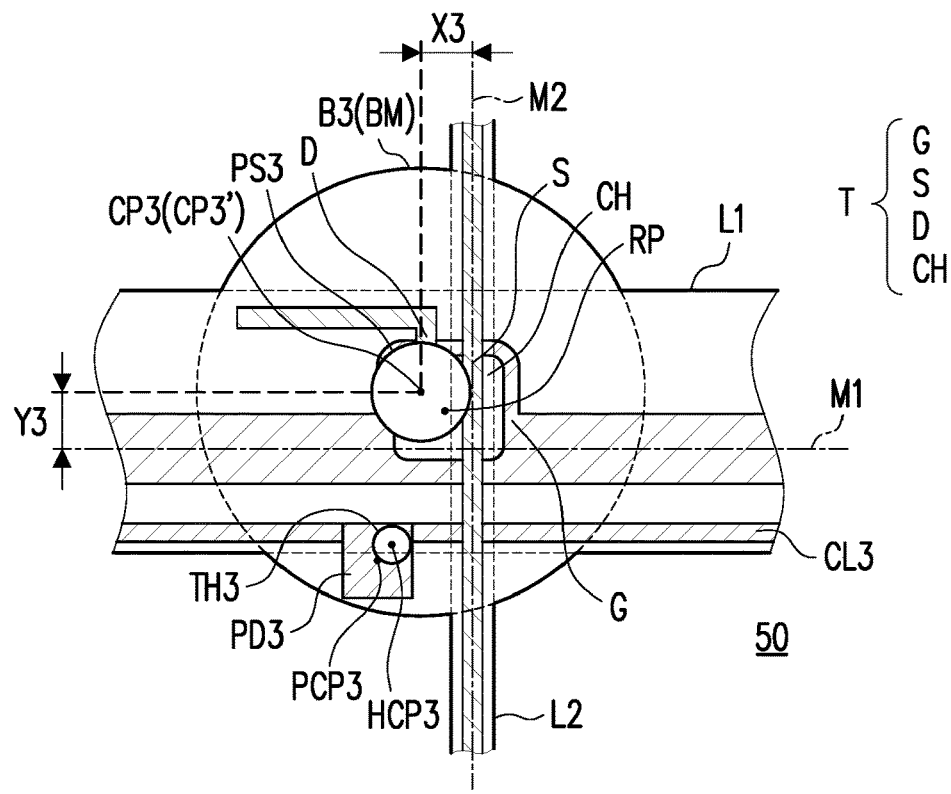
FIG. 9C is an enlarged view of some components of a display device according to an embodiment of the disclosure.
Figure 9D:
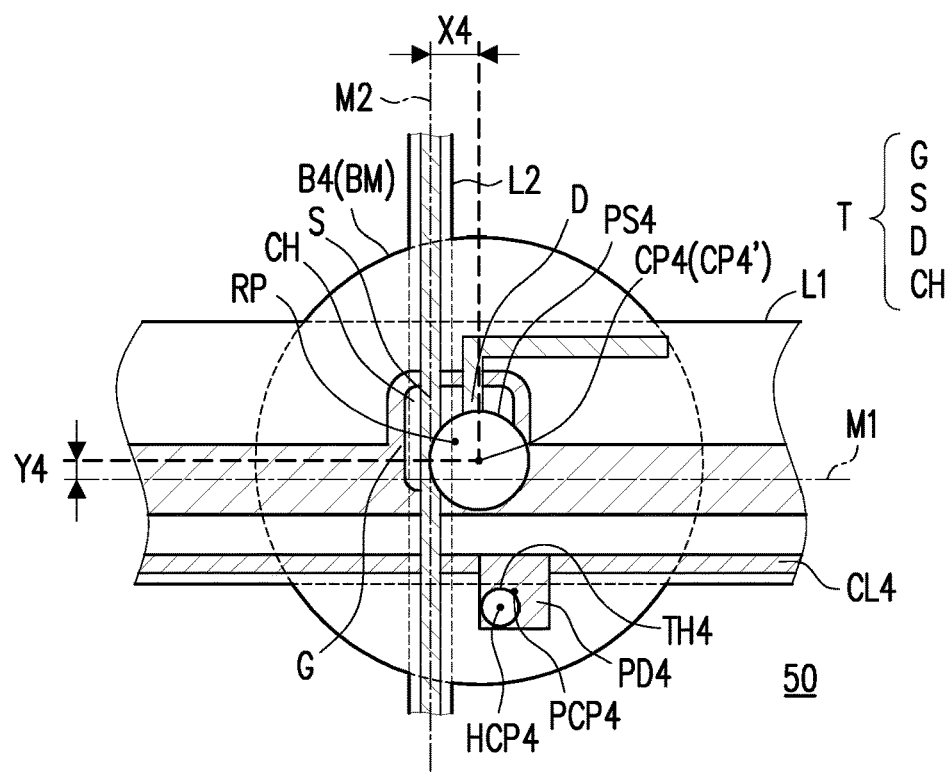
FIG. 9D is an enlarged view of some components of a display device according to an embodiment of the disclosure.

FIG. 9A is an enlarged view of some components of a display device according to an embodiment of the disclosure. FIG. 9B is an enlarged view of some components of a display device according to an embodiment of the disclosure. FIG. 9C is an enlarged view of some components of a display device according to an embodiment of the disclosure. FIG. 9D is an enlarged view of some components of a display device according to an embodiment of the disclosure. The embodiments of FIGS. 9A to 9D use the element reference numerals and partial contents of the embodiments of FIGS. 8A to 8F. The same or similar reference numerals are used to express the same or similar elements, and the description of the same technical content is omitted. For the descriptions of the omitted parts, reference is directed to the aforementioned embodiment, and will not be repeated in the following. FIGS. 9A to 9D are partially enlarged views of different regions in a display device 50.

Referring to FIGS. 9A to 9D, a black matrix BM of the display device 50 includes a plurality of first portions L1, a plurality of second portions L2, a first covering portion B1, a second covering portion B2, a third covering portion B3 and a fourth covering portion B4.

The first spacer PS1 overlaps the source S and the drain D of one of the active elements T in the direction P1 perpendicular to the first substrate SB1. The second spacer PS2 overlaps the source S and the drain D of another one of the active elements T in the direction P1 perpendicular to the first substrate SB1. In the present embodiment, the shortest distance Y1 between the center CP1 of the first spacer PS1 and the center line M1 of the closest one of the first portions L1 is different from the shortest distance Y2 between the center CP2 of the second spacer PS2 and the center line M1 of the closest one of the first portions L1.

In the present embodiment, in a horizontal direction (an extending direction of the center line M1), the first spacer PS1 is closer to the first through hole TH1 than the reference point RP. In a vertical direction (an extending direction of the center line M2), the direction where the first spacer PS1 is deviated from the reference point RP is substantially the same as the direction where the first through hole TH1 is deviated from the center PCP1 (for example, both the directions are the downward direction in FIG. 9A).

In the present embodiment, in the horizontal direction (the extending direction of the center line M1), the second spacer PS2 is closer to the second through hole TH2 than the reference point RP. In the vertical direction (the extending direction of the center line M2), the direction where the second spacer PS2 is deviated from the reference point RP is substantially the same as the direction where the second through hole TH2 is deviated from the center PCP2 (for example, both the directions are the upward direction in FIG. 9B).

The third spacer PS3 overlaps the source S and the drain D of yet another of the active elements T in the direction P1 perpendicular to the first substrate SB1. The fourth spacer PS4 overlaps the source S and the drain D of still another of the active elements T in the direction P1 perpendicular to the first substrate SB1. In the present embodiment, the shortest distance Y3 between the center CP3 of the third spacer PS3 and the center line M1 of the closest one of the first portions L1 is different from the shortest distance Y4 between the center CP4 of the fourth spacer PS4 and the center line M1 of the closest one of the first portions L1.

In the present embodiment, in the horizontal direction (the extending direction of the center line MD, the third spacer PS3 is closer to the third through hole TH3 than the reference point RP. In the vertical direction (the extending direction of the center line M2), the direction where the third spacer PS3 is deviated from the reference point RP is substantially the same as the direction where the third through hole TH3 is deviated from the center PCP3 (for example, both the directions are the upward direction in FIG. 9C).

In the present embodiment, in the horizontal direction (the extending direction of the center line MD, the fourth spacer PS4 is closer to the fourth through hole TH4 than the reference point RP. In the vertical direction (the extending direction of the center line M2), the direction where the fourth spacer PS4 is deviated from the reference point RP is substantially the same as the direction where the fourth through hole TH4 is deviated from the center PCP4 (for example, both the directions are the downward direction in FIG. 9D).

Based on the above, the shortest distance between the center of the first spacer and the center line of the closest one of the first portions is different from the shortest distance between the center of the second spacer and the center line of the closest one of the first portions. Therefore, the sum of the area that the first spacer overlaps the corresponding drain and source in the direction perpendicular to the first substrate and the area that the second spacer overlaps the corresponding drain and source in the direction perpendicular to the first substrate is not easily affected by the offset of the procedure of aligning the first substrate and the second substrate.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A display device, comprising:
   a first substrate;
   a plurality of first signal lines and a plurality of second signal lines, located on the first substrate, and respectively extending along a first extending direction and a second extending direction;
   a plurality of active elements, wherein each of the active elements is electrically connected to a corresponding one of the first signal lines and a corresponding one of the second signal lines;
   a plurality of pixel electrodes, electrically connected to the plurality of active elements;
   a second substrate, facing the first substrate;
   a black matrix, located on the second substrate, and comprising:
      a plurality of first portions, extending along the first extending direction and overlapping the plurality of first signal lines in a direction perpendicular to the first substrate, wherein a center line of each of the first portions substantially extends along a corresponding one of the first signal lines; and
      a plurality of second portions, extending along the second extending direction and overlapping the plurality of second signal lines in the direction perpendicular to the first substrate, wherein a center line of each of the second portions substantially extends along a corresponding one of the second signal lines;
   a first spacer, overlapping a source and a drain of one of the plurality of active elements in the direction perpendicular to the first substrate; and
   a second spacer, overlapping a source and a drain of another one of the plurality of active elements in the direction perpendicular to the first substrate, wherein a shortest distance between a center of the first spacer and the center line of a closest one of the plurality of first portions is different from a shortest distance between a center of the second spacer and the center line of a closest one of the plurality of first portions.

2. The display device according to claim 1, further comprising:
   a third spacer, overlapping a source and a drain of yet another of the plurality of active elements in the direction perpendicular to the first substrate; and
   a fourth spacer, overlapping a source and a drain of still another of the plurality of active elements in the direction perpendicular to the first substrate, wherein a shortest distance between a center of the third spacer and the center line of a closest one of the plurality of second portions is different from a shortest distance between a center of the fourth spacer and the center line of a closest one of the plurality of second portions.

3. The display device according to claim 2, wherein a reference point is provided between the source and the drain of each of the active elements, and in the direction perpendicular to the first substrate,
   the center of the first spacer is located at bottom left relative to the reference point of the one of the plurality of active elements,
   the center of the second spacer is located at top left relative to the reference point of the another one of the plurality of active elements,
   the center of the third spacer is located at top right relative to the reference point of the yet another of the plurality of active elements, and
   the center of the fourth spacer is located at bottom right relative to the reference point of the still another of the plurality of active elements.

4. The display device according to claim 1, wherein the center line of each of the plurality of second portions or the center line of each of the plurality of first portions is zigzag.

5. The display device according to claim 1, further comprising:
   a plurality of blue filters, a plurality of green filters and a plurality of red filters, located between the first substrate and the second substrate, wherein a shortest distance between the first spacer and the plurality of blue filters is shorter than a shortest distance between the first spacer and the plurality of green filters or the plurality of red filters, and a shortest distance between the second spacer and the plurality of blue filters is shorter than a shortest distance between the second spacer and the plurality of green filters or the plurality of red filters.

6. The display device according to claim 1, wherein the black matrix further comprises:
   a first covering portion, overlapping the first spacer, wherein a center of the first covering portion is deviated from the center line of a corresponding one of the plurality of first portions along a first direction; and
   a second covering portion, overlapping the second spacer, wherein a center of the second covering portion is deviated from the center line of a corresponding one of the plurality of first portions along a second direction.

7. The display device according to claim 6, wherein the center of the first covering portion overlaps the center of the first spacer, and the center of the second covering portion overlaps the center of the second spacer.

8. The display device according to claim 1, further comprising:
   a first common signal line and a second common signal line, located on the first substrate;

a first connection pad and a second connection pad, respectively connected with the first common signal line and the second common signal line; and a common electrode, overlapping the plurality of pixel electrodes, wherein the common electrode is electrically connected with the first connection pad through a first through hole, the common electrode is electrically connected with the second connection pad through a second through hole, a center of the first through hole is deviated from a center of the first connection pad along a first offset direction, and a center of the second through hole is deviated from a center of the second connection pad along a second offset direction.

9. The display device according to claim 8, wherein the first offset direction and the second offset direction are opposite.

10. The display device according to claim 8, wherein the black matrix further comprises:

a first covering portion, overlapping the first connection pad and the first spacer in the direction perpendicular to the first substrate; and a second covering portion, overlapping the second connection pad and the second spacer in the direction perpendicular to the first substrate.

11. The display device according to claim 10, further comprising:

a plurality of blue filters, a plurality of green filters and a plurality of red filters, located between the first substrate and the second substrate, wherein a shortest distance between the first covering portion and the plurality of blue filters is shorter than a shortest distance between the first covering portion and the plurality of green filters or the plurality of red filters, and a shortest distance between the second covering portion and the plurality of blue filters is shorter than a shortest distance between the second covering portion and the plurality of green filters or the plurality of red filters.

12. A display device, comprising:

a first substrate;

a plurality of first signal lines and a plurality of second signal lines, located on the first substrate, and respectively extending along a first extending direction and a second extending direction;

a plurality of active elements, wherein each of the active elements is electrically connected to a corresponding one of the first signal lines and a corresponding one of the second signal lines;

a plurality of pixel electrodes, electrically connected to the plurality of active elements;

a first common signal line and a second common signal line, located on the first substrate;

a first connection pad and a second connection pad, respectively connected with the first common signal line and the second common signal line;

a common electrode, overlapping the plurality of pixel electrodes, wherein the common electrode is electrically connected with the first connection pad through a first through hole, the common electrode is electrically connected with the second connection pad through a second through hole, a center of the first through hole is deviated from a center of the first connection pad along a first offset direction, and a center of the second through hole is deviated from a center of the second connection pad along a second offset direction; and a second substrate, facing the first substrate.

13. The display device according to claim 12, wherein the first offset direction and the second offset direction are opposite.

14. The display device according to claim 12, further comprising:

a black matrix, located on the second substrate, and comprising:

a plurality of first portions, extending along the first extending direction and overlapping the plurality of first signal lines, wherein a center line of each of the first portions substantially extends along a corresponding one of first signal lines;

a plurality of second portions, extending along the second extending direction and overlapping the plurality of second signal lines, wherein the center line of each of the second portions substantially extends along a corresponding one of the second signal lines; and a first spacer, overlapping a source and a drain of one of the active elements.

15. The display device according to claim 14, further comprising:

a second spacer, overlapping a source and a drain of another one of the plurality of active elements, wherein a shortest distance between a center of the first spacer and the center line of a closest one of the plurality of first portions is different from a shortest distance between a center of the second spacer and the center line of a closest one of the plurality of first portions.

16. The display device according to claim 15, further comprising:

a third spacer, overlapping a source and a drain of yet another of the active elements; and a fourth spacer, overlapping a source and a drain of still another of the plurality of active elements, wherein a shortest distance between a center of the third spacer and the center line of a closest one of the plurality of second portions is different from a shortest distance between a center of the fourth spacer and the center line of a closest one of the plurality of second portions.

17. The display device according to claim 15, wherein the black matrix further comprises:

a first covering portion, overlapping the first spacer, wherein a center of the first covering portion is deviated from the center line of a corresponding one of the plurality of first portions along a first direction; and a second covering portion, overlapping the second spacer, wherein a center of the second covering portion is deviated from the center line of a corresponding one of the plurality of first portions along a second direction.

18. The display device according to claim 14, wherein the center line of each of the plurality of second portions or the center line of each of the plurality of first portions is zigzag.

19. The display device according to claim 14, further comprising:

a plurality of blue filters, a plurality of green filters and a plurality of red filters, located between the first substrate and the second substrate, wherein a shortest distance between the first spacer and the plurality of blue filters is shorter than a shortest distance between the first spacer and the plurality of green filters or the plurality of red filters.

20. The display device according to claim 14, wherein the black matrix further comprises:

a first covering portion, overlapping the first connection pad and the first spacer; and a second covering portion, overlapping the second connection pad.

* * * * *